Dec. 18, 1951     H. L. HELWICK     2,579,074
FISHERMAN'S ROD WINDER
Filed Aug. 14, 1950
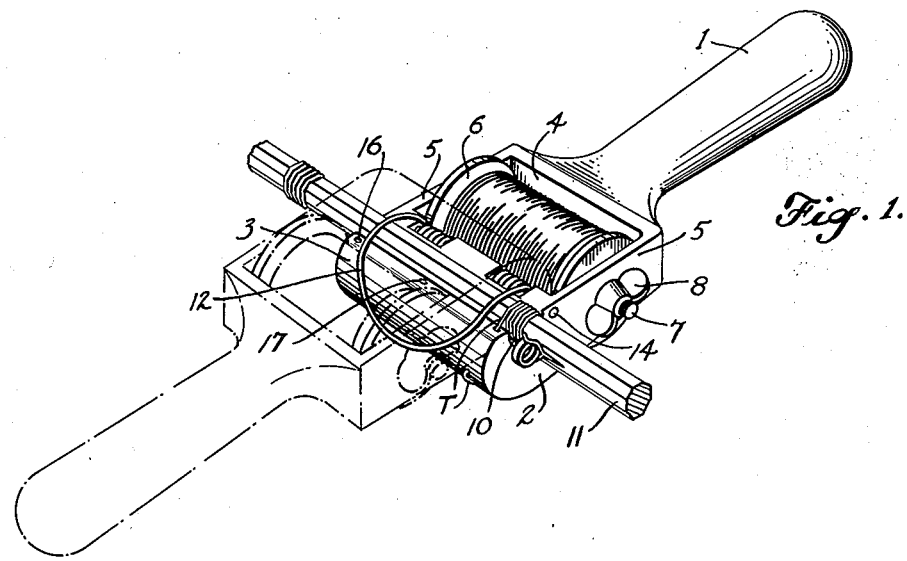
Fig. 1.
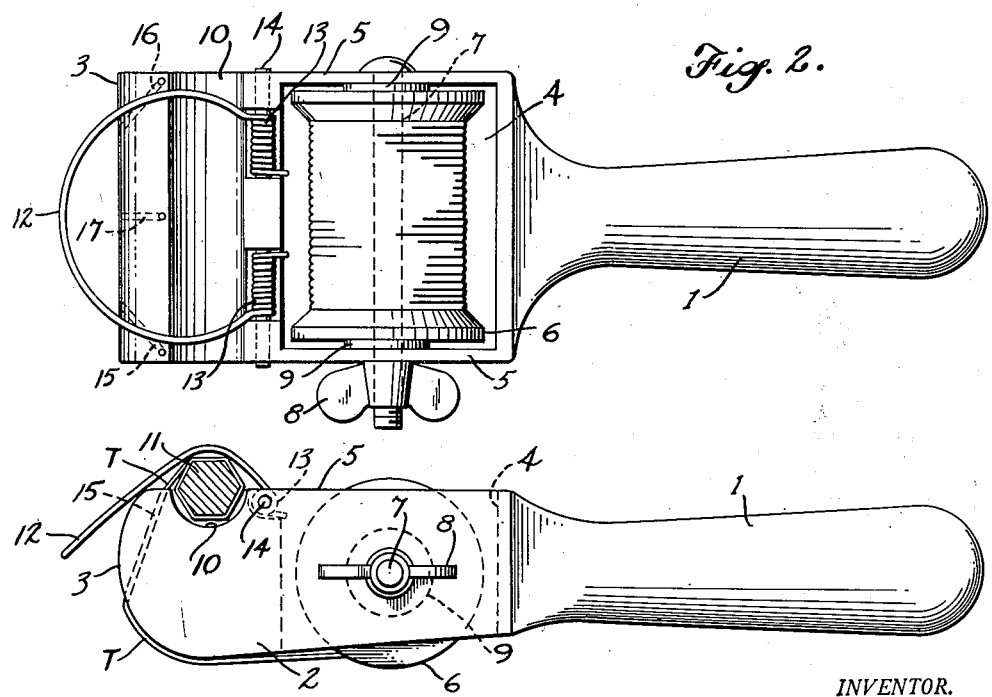
Fig. 2.
Fig. 3.
INVENTOR.
HAROLD L. HELWICK
BY Reynolds, Beach & Christensen
ATTORNEYS Patented Dec. 18, 1951

2,579,074

UNITED STATES PATENT OFFICE 2,579,074

FISHERMAN'S ROD WINDER

Harold L. Helwick, Renton, Wash.

Application August 14, 1950, Serial No. 179,192

2 Claims. (Cl. 242—96)

The present invention provides a small, light, compact, and easily manipulated tool for the use of fishermen in winding their rods, rugged enough to withstand considerable abuse, and adapted to standard thread spools and to rods of all normal sizes.

It will be understood that line guides and tips are customarily held to the fishing rod by wrappings of silk thread or the like, and that many fine rods are made of split bamboo and are wrapped at intervals to maintain the integrity of the rod and the balance between flexibility and rigidity such as the user desires. While these wrappings do not often become loose, they are occasionally injured, or through injury to a line guide or tip it becomes necessary to replace the same while the user is on a fishing trip, and it is the primary object of the present invention to provide a tool which can be carried by the fisherman without greatly adding to the bulk or weight of his load, which is compact in form and therefore not likely to become entangled with leaders or other articles in his tackle box, cheap and simple in construction, and capable of employing commercial spools whereon thread is supplied for such purposes. Likewise, it is an object to provide in such a tool a convenient and simple means of adjusting the tension of the thread during or preparatory to winding, and of retaining the rod in correct operative position during the operation.

With these objects in mind and others that will appear hereinafter, the present invention comprises the novel rod winder tool and the novel combination and arrangement of the parts thereof, as shown in the accompanying drawings, and as will be hereinafter described and more fully pointed out in the claims.

The drawings illustrate the tool in a presently preferred and practical form of execution, but it will be understood that certain changes may be made therein, within the scope of the claims, without departing from the spirit of the invention.

Figure 1 is an isometric view of the tool, shown in operative relationship to a fishing rod and to a line guide which is being secured thereto by wrapping.

Figure 2 is a plan view, and Figure 3 is a side elevation or edge view of the tool.

It is the intention to make the tool of a moldable plastic material, and preferably in the main of one piece of material. The frame is shown as composed of a single piece consisting of a handle portion 1 at one end, a generally flattened body portion 2 having a tip 3 which preferably is rounded as viewed from the edge, and between the handle and the tip is formed with an aperture 4 of generally rectangular form, with thin, and therefore flexible, sidewalls 5. The purpose of this aperture is to receive a standard spool 6 whereon silk thread or the like is commonly supplied commercially. Such a spool is readily rotatively supported in the aperture 4, and is as readily removed therefrom, by pivot means such as the bolt 7, headed at one end and threaded at its opposite end, upon which latter end is threadedly mounted the adjusting wing nut 8. Washers 9 may serve to space the ends of the spool from the end walls 5 of the aperture, and when pressed inwardly by tightening up the wing nut 8, these washers create friction serving to resist rotation of the spool.

Paralleling the pivot bolt 7 near the tip 3 of the frame is a groove 10, which is located in one face of the frame, which may be termed, to distinguish it, the upper face. This groove is of a size to receive conveniently an ordinary fishing rod, such as is shown at 11, but not appreciably larger. Preferably the groove is sufficiently shallow that the rod projects above the upper surface of the frame wherein the groove is formed, for in this way proper laying and tensioning of the wrapping is facilitated.

In order to hold the rod within this groove, and yet to permit the ready insertion and removal of the rod when desired, resilient holddown means are provided which, in the form shown, consist of a single piece of wire formed between its ends in somewhat of a U-shape or loop, as shown at 12, to overlie the groove 10 and to extend beyond the tip 3, and having at its ends coils 13 which constitute pivot loops through which is passed a pivot pin 14, which is secured within the frame 2. With the ends of the coils 13 pressing against the frame, the U-shaped loop 12 is urged downwardly or toward the frame to embrace and retain a rod, in the manner shown in Figures 1 and 3.

It is preferred that the tip 3 of the frame be rounded, as viewed from the edge (see Figure 3), and this rounded portion, in part at least, serves as a guide for the thread T as it runs off the spool 6. The thread is preferably directed through guide holes 15, 16 and 17 to a point in the immediate vicinity of the outer edge of the groove 10, and at different points in the length of the groove, so that it may wrap an eye at either end, in the manner shown in Figure 1, or may wrap an intermediate portion of the rod which is disposed between the ends of the groove 10.

It is believed the manner of using the tool will be self-evident. With a spool of thread secured in place in the aperture 4, and with its end threaded through whichever one of the holes 15, 16 or 17 is most convenient to the intended use, the rod 11 is laid in the groove 10 and is held therein by the overlying loop 12. The thread is started about the rod, and then either the rod is rotated, holding the tool stationary, or the rod is held stationary and the tool is rotated around the supporting rod. In either case the thread feeds out under just the correct degree of tension, as determined by the wing nut at 8, and the thread lays itself in proper wrappings closely adjacent one another along so much of the rod as it is desired to wrap, after which its end is secured in the normal manner.

The tool is compact, being in a typical example of an over-all length of four and one-half inches, a width of one and one-half inches plus the amount of protrusion of the pivot post 7 and its wing nut, and of a thickness which is less than one inch. Being of one piece it is thoroughly rugged, and yet has flexibility where that is needed. Any color or strength of wrapping thread may be employed, and if the thread already in place is not of the type desired it is a simple matter to replace the spool with a different one. The tool can be carried in the fisherman's pocket or in his tackle box, and is unlikely to become snarled up in leaders or the like. It is not particularly heavy and so can be taken with the fisherman even into remote regions, and consequently is readily available for use whenever and wherever needed.

I claim as my invention:

1. A rod winder comprising an elongated frame formed at one end as a handle, and extending in generally flat form to the tip of its opposite end, such opposite end having a transverse rod-receiving groove in one face inwardly of its tip, the flat portion of the frame having a transverse aperture between the handle and the groove for the reception of a thread-bearing spool, means for rotatively and removably mounting such a spool in said aperture, adjustable means to variably resist rotation of such a spool and thereby to tension the thread, thread-guiding means formed on the frame's tip to lead thread from the spool to the edge of the rod-receiving groove, a rod-retaining element formed of resilient material pivotally mounted on the frame, along an axis parallel to the groove, and reacting from the frame to overlie and resiliently retain a rod disposed in such groove, or to swing aside from such operative position for insertion of a rod in the groove, or for removal therefrom.

2. A rod winder as in claim 1, wherein the rod-retaining means is formed of one piece of resilient wire bent into U-shape and coiled at its ends transversely to the groove and receiving the wire's coils, the wire's ends reacting from the frame to retain the U resiliently overlying a rod disposed in the groove.

HAROLD L. HELWICK.

REFERENCES CITED

The following references are of record in the file of this patent:

UNITED STATES PATENTS

| Number | Name | Date |
| --- | --- | --- |
| 9,412 | Southworth | Nov. 16, 1852 |
| 155,504 | Dayton | Sept. 29, 1874 |
| 464,279 | Fraser | Dec. 1, 1891 |
| 1,272,452 | Johnson | July 16, 1918 |
| 1,431,784 | Dillon | Oct. 10, 1922 |
| 1,838,874 | Serres | Dec. 29, 1931 |
| 1,890,739 | Lunt | Dec. 13, 1932 |
| 2,419,241 | Wingate | Apr. 22, 1947 |